H. A. MOYER.

HUB BORING MACHINE.

No. 10,360. Reissued July 31, 1883.

WITNESSES:
T. S. West.
Wm. T. Emerson.

INVENTOR:
H. A. MOYER,
BY H. W. Beadle & Co.
ATTYS.

N. PETERS, Photo-Lithographer, Washington, D. C.

H. A. MOYER.

HUB BORING MACHINE.

No. 10,360. Reissued July 31, 1883.

WITNESSES:
J. S. West.
Wm. T. Emerson.

INVENTOR:
H. A. MOYER,
BY H. W. Beadle & Co.
ATTYS.

N. PETERS, Photo-Lithographer, Washington, D. C.

UNITED STATES PATENT OFFICE.

HARVEY A. MOYER, OF SYRACUSE, NEW YORK.

HUB-BORING MACHINE.

SPECIFICATION forming part of Reissued Letters Patent No. 10,360, dated July 31, 1883.

Original No. 260,774, dated July 11, 1882. Application for reissue filed May 19, 1883.

*To all whom it may concern:*

Be it known that I, HARVEY A. MOYER, a citizen of the United States, residing at Syracuse, in the county of Onondaga and State of New York, have invented certain new and useful Improvements in Machines for Boring Hubs, of which the following is a specification, reference being had therein to the accompanying drawings.

This invention relates to that class of machines which are specially designed for boring wheel-hubs; and it consists, mainly, first, in the combination of a horizontal supporting-bed for the wheel with two vertical boring-spindles, one located above and the other below the supporting-bed; and, second, in the combination, with the horizontal supporting-bed, of a device for centering the hub relatively to the boring-spindles and holding it during the boring action.

It consists, further, in certain other combinations of parts, which, in connection with the foregoing, will be fully described hereinafter.

Figure 1:
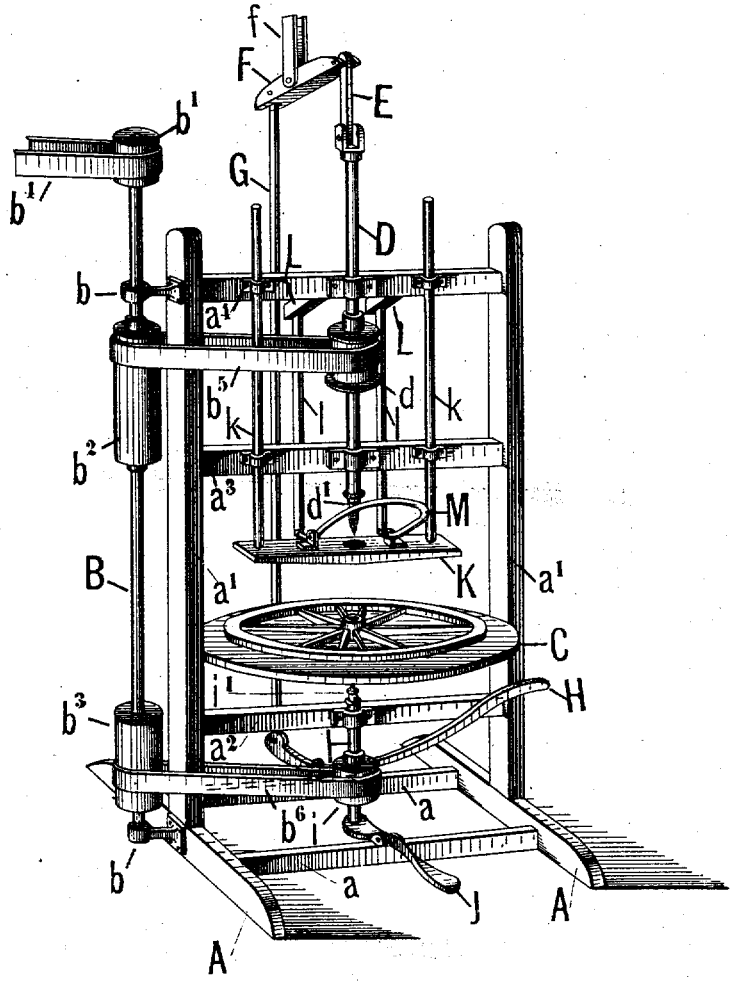
Figure 2:
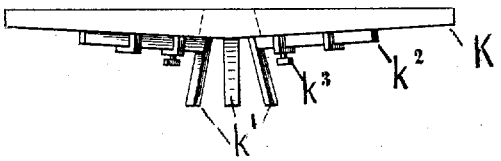
Figure 3:
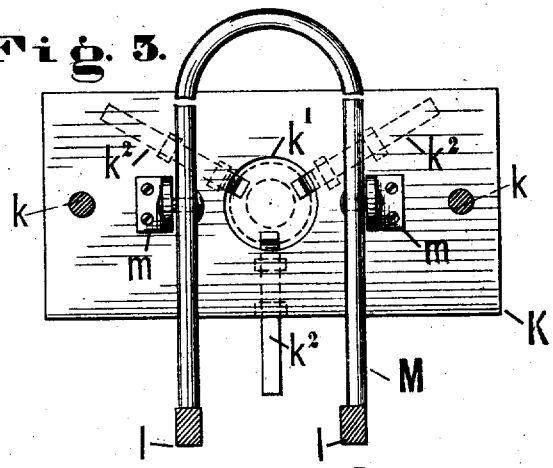
Figure 4:
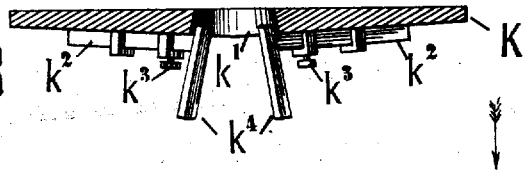

In the drawings, Figure 1 is a perspective view of my improved machine; Fig. 2, a side view of the mechanism for centering and holding the hub upon the supporting-bed; Fig. 3, a top view; Fig. 4, a section of the same; and Figs. 5, 6, and 7, views illustrating its operation.

To enable others skilled in the art to make my invention and properly use the same, I will proceed to describe fully its construction and manner of operation.

A A represent the main base-beams, which are united by the transverse base-beams *a a*, as shown. *a′ a′* represent vertical standards united by the lower, middle, and upper transverse beams, $a^2$ $a^3$ $a^4$, as shown. These parts constitute the frame-work of the machine, by means of which the remaining parts are supported.

B represents a vertical driving-shaft, supported by proper bearing-brackets, *b b*, extending from one of the vertical standards of the frame, which is provided with the pulleys *b′* $b^2$ $b^3$, as shown. The pulleys $b^2$ $b^3$, it will be observed, have prolonged bearing-surfaces, for the purpose of permitting the belts running thereon to have free movement in a vertical direction within certain limits.

$b^4$ represents a belt by means of which movement is communicated through the pulley *b′*, from any proper source of power, to the driving-shaft B.

$b^5$ represents a belt by means of which movement is communicated to the upper boring-spindle, hereinafter referred to; and $b^6$, a belt by means of which movement is communicated to the lower boring-spindle, hereinafter referred to.

C represents a horizontal bed or plate having a central opening, which bed or plate is firmly secured to the frame-work in such position as to support the wheel properly during the operation of boring the hub.

D represents the upper boring-spindle, supported in proper bearings in the transverse beams $a^3$ $a^4$ in such manner as to move freely within certain limits in a vertical direction.

*d* represents a pulley upon the spindle adapted to take the belt $b^5$, and *d′* a drill or cutter of any proper construction, which is secured to the lower end in the manner well understood.

E represents a connecting rod or bar by means of which the upper end of the boring-spindle D is united to one end of the pivoted lever F, as shown.

*f* represents a strap or bar by means of which the lever F is suspended from any proper point of support.

G represents a push-rod, which is united at its upper end to one end of the pivoted lever F, and at its lower end to the end of the rear arm of the hand-lever H, which lever is pivoted upon the rear transverse beam, as shown. The front arm of this lever, it will be observed, is extended outward into proper position to be conveniently used by the workman.

I represents the lower boring-spindle, supported in proper bearings in the transverse beam $a^2$ in such manner as to move freely within certain limits in a vertical direction.

*i* represents a pulley upon the spindle adapted to take the belt $b^6$, and *i′* a drill or cutter of any proper construction, which is secured to the lower end in the manner well understood.

J represents a foot-lever pivoted to the front transverse beam, *a*, the end of the rear arm of which is held beneath the lower end of the spindle I, as shown.

K represents a horizontal board or plate, of proper form or size, which is provided with vertical rods *k k*, held in proper bearings in the transverse beams $a^3$ $a^4$, in such manner as to move freely within certain limits in a vertical direction, as shown.

*k'*, Figs. 3 and 4, represents a central opening in the board or plate, and $k^2$ $k^2$ $k^2$ three bars secured to the lower side of the latter in such manner as to be capable of longitudinal adjustment within certain limits, as shown.

$k^3$ represents a set-screw, by means of which the bar, when adjusted, may be properly secured.

$k^4$ represents a bearing-block secured to the inner end of each bar $k^2$ upon a line inclined from the vertical, as shown. These bars, it will be observed, are so located upon the board or plate K in relation to each other and the central opening in the board that the bearing-blocks at their inner ends are caused to inclose within the opening a central space, as shown in Fig. 3, which space is greater or less in area according to the longitudinal adjustment of the bars.

L L represent brackets extending from the transverse beam $a^4$, and *l l* fixed rods extending therefrom, as shown.

M represents a U-shaped lever, the ends of which are held by the lower ends of the fixed rods *l l*, as shown.

*m m* represent brackets, by means of which the plate K is secured to this lever in such manner as to be properly moved thereby when desired.

Figure 5:
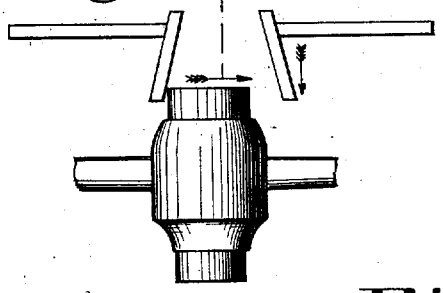
Figure 6:
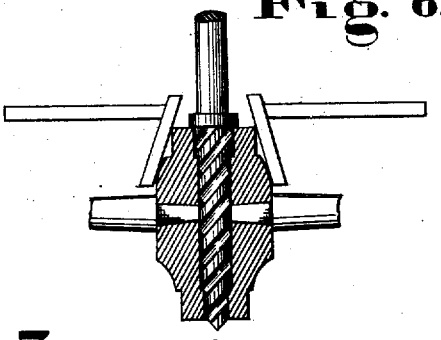
Figure 7:
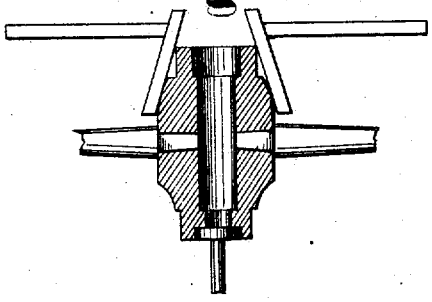

The operation is substantially as follows: The machine having been set in motion and a wheel having been placed upon the supporting-bed, the lever M is first depressed to bring down the centering device upon the hub and move the same into its proper position relatively to the boring-spindle, as shown in Fig. 5. This adjustment of the hub is effected by the action of the inclined bearing-blocks $k^4$, the contact of any one of these in its descent moving the hub laterally upon the supporting-bed until a bearing is found against the other two, as indicated in Fig. 6. When the hub has reached its proper position, the downward movement of the lever M is arrested, and it is then held in its depressed position by one hand of the workman until the entire boring action has been completed. By this means the hub is held against movement while the cutting-tools act upon it, as shown in Figs. 6 and 7. The hand-lever H is next depressed in the operation of the machine to bring down the upper spindle and bore out the portions which its cutter is adapted to remove.

This lever, then, after its work has been performed, is returned to its normal position, for the purpose of withdrawing the cutter from the hub. The foot-lever J is next depressed in the operation of the machine to bring up the lower spindle and bore out the portion which its cutter is adapted to remove. This lever, then, after its work has been performed, is permitted to return to its normal position, for the purpose of withdrawing the cutter from the hub. The lever M is then raised to disengage the centering device. The hub thus having been bored, the wheel may be removed from the supporting-bed and a new one placed in position.

From the foregoing description it will be understood that after the wheel has been laid upon the supporting-bed the hub is first centered, and then held by the action of one hand of the workman, and then bored above by the action of the other hand, and then bored below by the action of one foot. These successive actions, being simple in their character, may be performed with great rapidity.

Some of the advantages of the described construction are as follows: By the employment of a horizontal supporting-bed, the wheel, when adjusted upon the same, is caused to retain its position by the action of gravitation, while upon a vertical bed the tendency of the wheel is to move from its proper position. By the employment of a centering device substantially as described, the hub is brought easily and quickly to the precise position desired. By the arrangement of the hand and foot levers as described, the necessary actions may be performed with great rapidity. The centering device may be readily adjusted for large or small hubs by moving the horizontal bars $k^2$.

I am aware that the combination of two horizontal boring-spindles with a vertical supporting-bed is old, and I therefore do not claim any such combination.

Having thus fully described my invention, what I claim as new, and desire to secure by Letters Patent, is—

1. In a hub-boring machine, the combination of the following elements: a horizontal supporting-bed for the wheel, two vertical boring-spindles, and a centering device located above the supporting-bed, and adapted to move down upon the hub to automatically center the same, substantially as and for the purpose described.

2. In a hub-boring machine, the combination of the following elements: a horizontal supporting-bed for the wheel, two vertical boring-spindles, a centering device located above the supporting-bed, and a hand-lever for bringing down the centering device upon the hub.

3. In a machine of substantially the described construction, having a horizontal supporting-bed, a vertically-moving centering device, two vertically-moving boring-spindles, the hand-lever M, for actuating the centering device, the hand-lever H, with proper connections for actuating the upper boring-spindle, and the foot-lever J, for actuating the lower boring-spindle, substantially as described.

4. In a hub-boring machine, a stationary wheel-support combined with the following system of devices: an upper boring-spindle and operating-lever, a lower boring-spindle and operating-lever with foot-treadle, and a vertically-moving centering device, each of said devices being directly under the control of the operator, and capable of either independent or simultaneous action at will, substantially as and for the purpose described.

This specification signed and witnessed this 23d day of March, 1883.

HARVEY A. MOYER.

Witnesses:
J. A. ALLIS,
JAMES MULHESAN.